United States Patent [19]

McCray

[11] Patent Number: 5,009,033
[45] Date of Patent: Apr. 23, 1991

[54] GROUND COVER SHEET

[76] Inventor: Leonard A. McCray, 20817 NE. 87 Ave., Battle Ground, Wash. 98604

[21] Appl. No.: 121,280

[22] Filed: Nov. 16, 1987

[51] Int. Cl.$^5$ .......................... A01G 9/02; B32B 3/10
[52] U.S. Cl. ........................................ 47/80; 428/138
[58] Field of Search .................. 47/9, 80, 25, 32, 28, 47/26, 33, 19, 29, 56, 80, 17; 428/138, 198

[56] References Cited

U.S. PATENT DOCUMENTS

| | | | |
|---|---|---|---|
| 2,323,746 | 7/1943 | Woolf et al. | 45/56 |
| 3,315,408 | 4/1967 | Fisher | 47/9 |
| 3,619,944 | 11/1971 | Matvey | 47/33 |
| 3,704,544 | 12/1972 | Spanel et al. | 47/56 X |
| 4,090,325 | 5/1978 | Mushin et al. | 47/9 |
| 4,272,919 | 6/1981 | Schmidt | 47/56 |

FOREIGN PATENT DOCUMENTS

| | | | |
|---|---|---|---|
| 574897 | 4/1983 | France | 47/9 |
| 2588443 | 4/1987 | France | 47/79 |
| 0781262 | 11/1980 | U.S.S.R. | 47/9 |
| 1217303 | 3/1986 | U.S.S.R. | 47/9 |
| 2025194 | 1/1980 | United Kingdom | 47/9 |
| 2053640 | 2/1981 | United Kingdom | 47/32 |

Primary Examiner—Robert A. Hafer
Assistant Examiner—David N. Muir
Attorney, Agent, or Firm—Jerry T. Kearns

[57] ABSTRACT

A ground cover sheet for retaining bark dust and bark chips in place in a landscaping arrangement includes a base sheet and a cover sheet. A plurality of rows of short slits are spaced along the length of the cover sheet. The cover sheet is heat welded to the base sheet in a manner to cause bows formed by the spaced slits to extend convexly upwardly. These upwardly extending bows serve to retain bark dust and bark chips in place on the ground cover sheet. The base and cover sheets are preferably formed from a flexible plastic material of a brown color to match the bark dust. The base sheet is formed from a four mils thick material and the cover sheet is formed from a six mils thick material. The upwardly extending bows on the cover sheet may be reinforced with a nylon filament material.

10 Claims, 2 Drawing Sheets

GROUND COVER SHEET

BACKGROUND OF THE INVENTION

1. Field of the Invention

The present invention relates to ground cover sheets, and more particularly pertains to a new and improved ground cover sheet provided with upwardly extending bows to retain bark dust and bark chips in position. The conventional material utilized in landscaping is a polyvinyl plastic sheet material. This material is colored black and is spread on the surface of the ground to prevent weeds and grass from growing. It is then covered by brown colored bark dust and bark chips. This provides an attractive arrangement for a short period of time. Soon, however, rain and wind shift the brown bark dust, exposing patches of the shiny black polyvinyl material. This erosion occurs rapidly on sloped ground, although displacement of the bark dust due to humans and animals walking on the material on flat ground is also a problem. In order to overcome these difficulties, the present invention provides a ground cover sheet of a brown color provided with upwardly extending bows spaced in rows along the length of the sheet to retain bark dust and bark chips in position.

2. Description of the Prior Art

Various types of ground cover sheets are known in the prior art. A typical example of such a ground cover sheet is to be found in U.S. Pat. No. 921,484, which issued to A. Turner on May 11, 1909. This patent discloses a ground cover sheet for use as a mulch material around strawberry plants. The ground cover sheet may be formed as an elongated sheet provided with spaced apertures for the reception of strawberry plants. A plurality of smaller apertures allow water to pass through the sheet. U.S. Pat. No. 1,584,589, which issued to C. Adams on May 11, 1926, discloses a ground cover sheet for use in protecting strawberry plants. A corrugated cover sheet is attached to a base sheet. The sheet is provided with a central slit for reception around a strawberry plant. Apertures are provided in the corrugations of the cover sheet in order to trap insects between the cover and base sheets. U.S. Pat. No. 1,721,228, which issued to G. Marden on July 16, 1929, discloses a mulch sheet having a central aperture for reception of a plant or tree stem. The device consists of a mat formed from a straw material held together by spaced rows of stitches. U.S. Pat. No. 2,949,698, which issued to R. Downey et al on Aug. 20, 1960, discloses a mulch pad for use around trees. The pad comprises a square pad of fibrous material provided with a central aperture for the reception of the trunk of a tree. The aperture is connected by a slit to a side edge of the pad to allow insertion of the tree trunk. U.S. Pat. No. 3,727,347, which issued to R. Barnes on Apr. 17, 1973, discloses an artificial grass like ground cover sheet for reception around a tree. The device is formed as a circular mat provided with a central aperture connected by a slit to a side edge for allowing insertion of a tree trunk. Once in place around a tree trunk, a staple like spike is utilized to secure the edges of the mat together.

While the above mentioned devices are suited for their intended usage, none of these devices provides a ground cover sheet provided with rows of slits forming upwardly convex bows for retaining bark dust and bark chips in place. Further, none of the aforesaid devices is constructed from an inexpensive polyvinyl material. Inasmuch as the art is relatively crowded with respect to these various types of ground cover sheets, it can be appreciated that there is a continuing need for and interest in improvements to such ground cover sheets, and in this respect, the present invention addresses this need and interest.

SUMMARY OF THE INVENTION

In view of the foregoing disadvantages inherent in the known types of ground cover sheets now present in the prior art, the present invention provides an improved ground cover sheet. As such, the general purpose of the present invention, which will be described subsequently in greater detail, is to provide a new and improved ground cover sheet which has all the advantages of the prior art ground cover sheets and none of the disadvantages.

To attain this, a representative embodiment of the concepts of the present invention is illustrated in the drawings and makes use of a base sheet formed from a brown polyvinyl material and an overlying cover sheet also formed from a polyvinyl material and provided with spaced rows of short slits. The cover sheet is secured to the base sheet by heat weld zones extending across the width of the cover sheet. The heat weld zones are spaced along the length of the cover sheet, between each row of slits. The cover sheet is bowed upwardly between the heat weld zones, causing upwardly extending convex bows for the retention of bark dust and bark chips. The convex bows may be provided with nylon filament reinforcement.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ground cover sheet which has all the advantages of the prior art ground cover sheets and none of the disadvantages.

It is another object of the present invention to provide a new and improved ground cover sheet which may be easily and efficiently manufactured and marketed.

It is a further object of the present invention to provide a new and improved ground cover sheet which is of a durable and reliable construction.

An even further object of the present invention is to provide a new and improved ground cover sheet which is susceptible of a low cost of manufacture with regard to both materials and labor, and which accordingly is then susceptible of low prices of sale to the consuming public, thereby making such ground cover sheets economically available to the buying public.

Still yet another object of the present invention is to provide a new and improved ground cover sheet which provides in the apparatuses and methods of the prior art some of the advantages thereof, while simultaneously overcoming some of the disadvantages normally associated therewith.

Still another object of the present invention is to provide a new and improved ground cover sheet which provides spaced upwardly convex bows for the retention of bark dust and bark chips.

Yet another object of the present invention is to provide a new and improved ground cover sheet which is colored brown and provided with rows of convex upwardly extending bows for the retention of bark dust and bark chips.

Even still another object of the present invention is to provide a new and improved ground cover sheet which is formed from a base sheet and a cover sheet formed from brown polyvinyl material.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
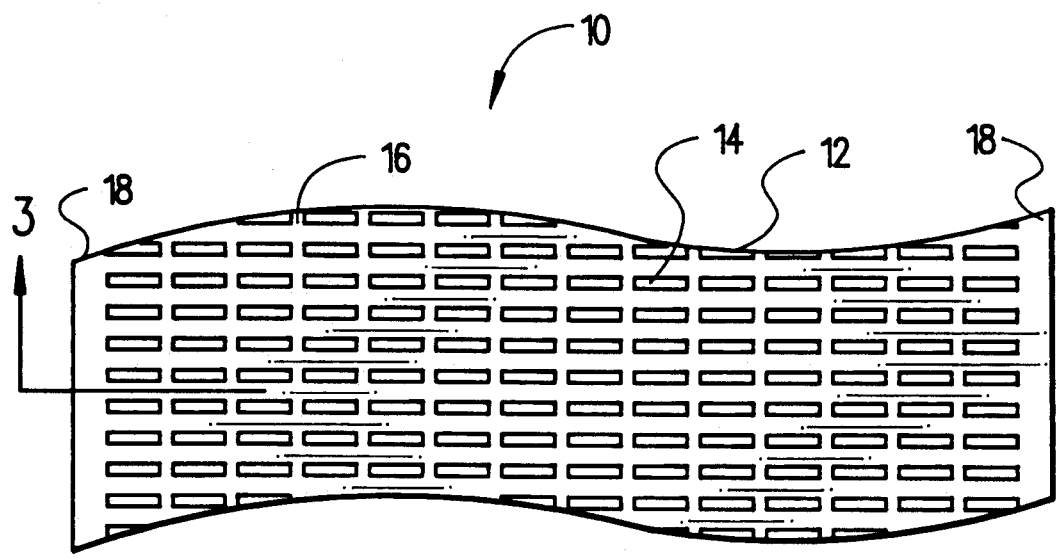
FIG. 1 is a top view of the ground cover sheet of the present invention.

With reference now to the drawings, and in particular to FIG. 1 thereof, a new and improved ground cover sheet embodying the principles and concepts of the present invention and generally designated by the reference numeral 10 will be described.

More specifically, it will be noted that the first embodiment 10 of the invention includes a cover sheet 12 preferably formed from a six mil thick brown polyvinyl material. Upwardly extending convex bows 14 are arranged in rows extending across the width of the cover sheet 12. A plurality of rows of the convex bows 14 are spaced along the length of the cover sheet 12. The convex bows 14 may be provided with nylon filament reinforcement fibers imbedded in the polyvinyl material for added durability. The cover sheet 12 is secured by heat weld zones 16 between each row of the convex bows 14. These heat weld zones 16 extend across the width of the cover sheet 12. These heat weld zones are spaced along the length of the cover sheet 12, and secure the cover sheet to a base sheet. Edge portions 18 of the cover sheet 12 are also provided with heat weld securement to the base sheet. The upwardly extending bows 14 are formed by pairs of slits two inches long and spaced one fourth inch apart. The heat weld zones 16 are preferably one half inch in width. Before securement of the cover sheet 12 to the base sheet, each row of slits is bowed upwardly, until the ends of the slits are spaced apart one and thirteenth sixteenths of an inch. This causes bows 14 to extend convexly upwardly. After each row has been bowed upwardly, a heat weld zone 16 is formed across the width of the cover sheet. This process is repeated along the length of the cover sheet 12.

Figure 2:
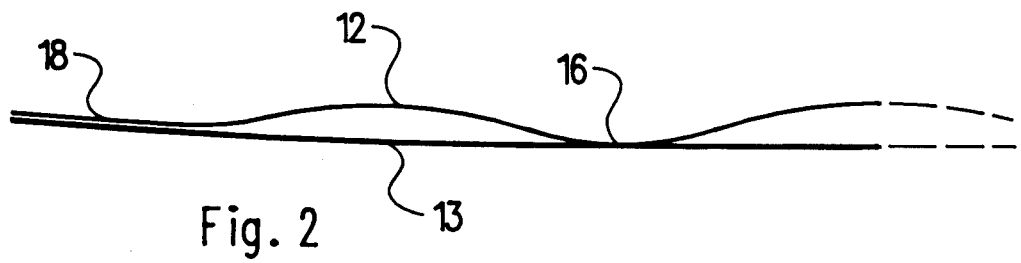
FIG. 2 is a side view of the ground cover sheet of the present invention.

With reference now to FIG. 2, it may be seen that the cover sheet 12 is secured at an edge portion 18 by a heat weld to a base sheet 13. The base sheet 13 is preferably formed from a four mil thick brown plastic material. The cover sheet 12 is also secured by a heat weld zone 16 extending across the width of the cover sheet 12 between each row of bows 14. As previously described, before formation of the heat weld zone 16, the cover sheet 12 is bowed slightly upwardly. This produces the illustrated upwardly convex configuration. These upwardly convex bows 14 serve to retain bark dust and bark chips in position on the cover sheet 12.

Figure 3:
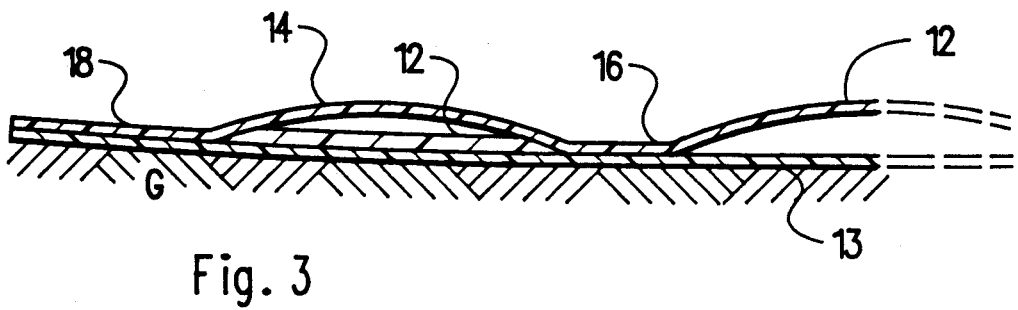
FIG. 3 is a cross sectional view taken along line 3 of FIG. 1, of the ground cover sheet of the present invention.

With reference now to FIG. 3, a cross sectional view taken along line 3 of FIG. 1 is provided. The base sheet 13 is shown laid out on the surface of the ground G. The upwardly convex bows 14 serve to prevent bark dust and bark chips from being displaced by rain and wind from the cover sheet 12. This, in conjunction with the brown coloration of the cover sheet 12 and the base sheet 13, provides an attractive, long lasting ground cover arrangement.

Figure 4:
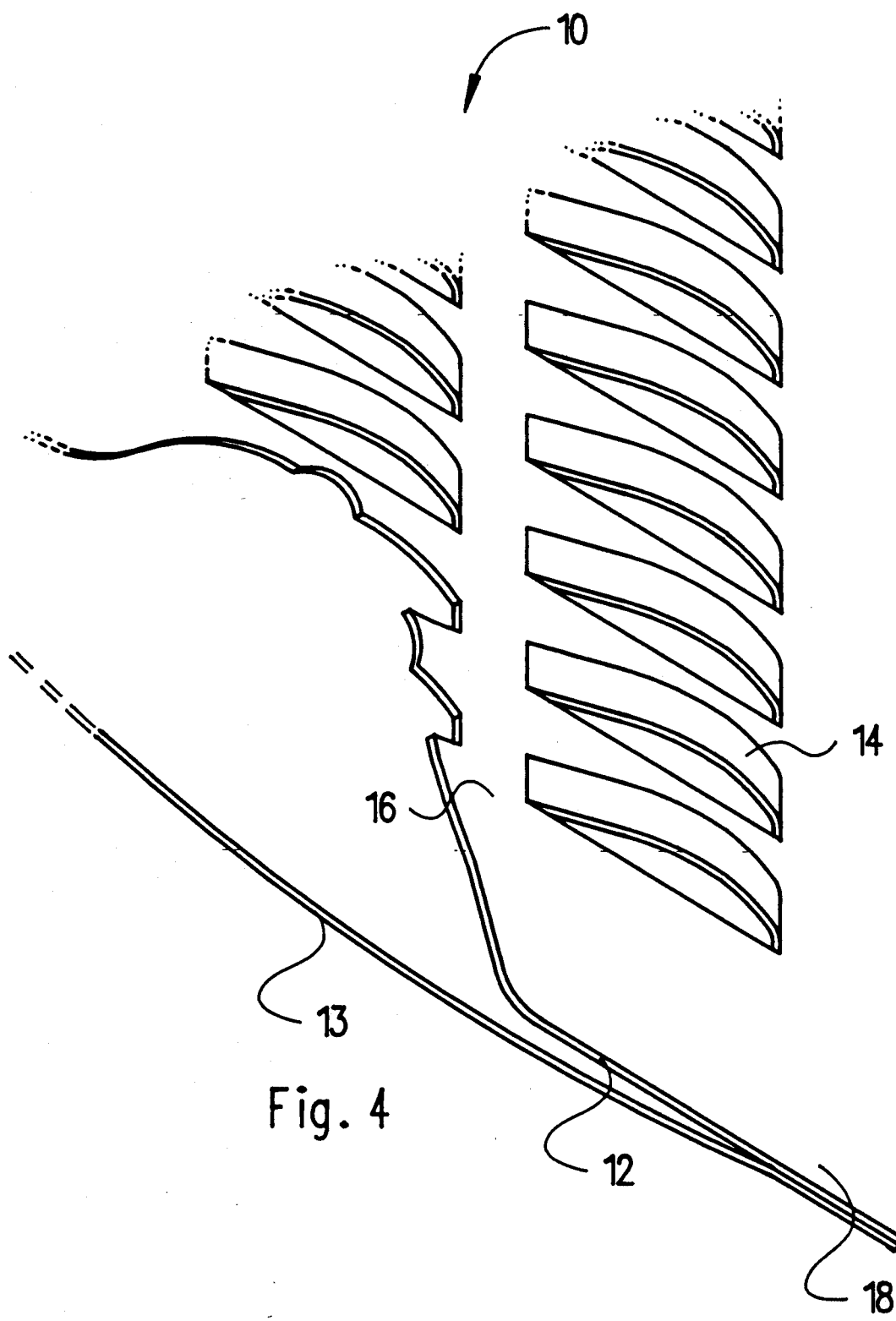
FIG. 4 is a perspective view, partially cut away, of a portion of the ground cover sheet of the present invention.

With reference now to FIG. 4, a perspective view, partially cut away, illustrating a portion of the ground cover sheet 10 of the present invention is provided. In use, bark dust and bark chips will be distributed on the cover sheet 12 after the base sheet 13 has been laid in a desired location on the surface of the ground. Especially on sloped areas, the upwardly extending bows 14 resist erosion of the bark dust and bark chips by wind and rain. The brown coloration of the cover sheet 12 and base sheet 13 matches the color of the bark dust.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved ground cover sheet for retaining bark dust and bark chips, comprising:
   an elongated base sheet formed from a flexible plastic material;
   an elongated cover sheet formed from a flexible plastic material and overlying said base sheet;
   a plurality of spaced heat weld zones extending across the width of said cover sheet, securing said cover sheet to said base sheet;
   a plurality of short slits in said cover sheet extending along a length of said cover sheet;
   said slits arranged in rows of spaced slits across the width of said cover sheet; and
   said slits forming a plurality of upwardly convex bows for engaging and retaining bark dust and bark chips.

2. The ground cover sheet of claim 1, wherein said base sheet is formed from a polyvinyl material four mils thick.

3. The ground cover sheet of claim 1, wherein said cover sheet is formed from a polyvinyl material six mils thick.

4. The ground cover sheet of claim 1, wherein said upwardly convex bows are provided with nylon reinforcing filaments.

5. The ground cover sheet of claim 1, wherein said base sheet and said cover sheet are formed from a brown plastic material.

6. The ground cover sheet of claim 1, wherein said heat weld zones are one half inch wide.

7. The ground cover sheet of claim 1, wherein each of said plurality of slits is two inches long and is spaced one quarter inch from each adjacent slit across the width of said cover sheet.

8. A new and improved ground cover sheet for retaining bark dust and bark chips, comprising:
   an elongated base sheet formed from a flexible plastic material four mils thick;
   an elongated cover sheet formed from a flexible plastic material six mils thick;
   said cover sheet overlying said base sheet;
   a plurality of two inch long slits extending in a lengthwise direction in said cover sheet;
   said slits spaced one fourth inch apart and arranged in rows extending across the width of said cover sheet;
   said slits forming a plurality of upwardly convex bows;
   a plurality of one half inch wide heat weld zones between said rows of slits;
   said heat weld zones extending across the width of said cover sheet and spaced along the length of said cover sheet; and
   said heat weld zones attaching said cover sheet to said base sheet.

9. The ground cover sheet of claim 8, wherein said upwardly convex bows are provided with nylon reinforcing filaments.

10. The ground cover sheet of claim 8, wherein said base sheet and said cover sheet are formed from a brown plastic material.

* * * * *